Dec. 2, 1924.  
C. J. REED  
1,518,126  
PROCESS OF CONVERTING MASSIVE AND OTHER FORMS OF SULPHUR INTO  
FINELY DIVIDED FLOWERS OF SULPHUR  
Filed Aug. 1, 1923
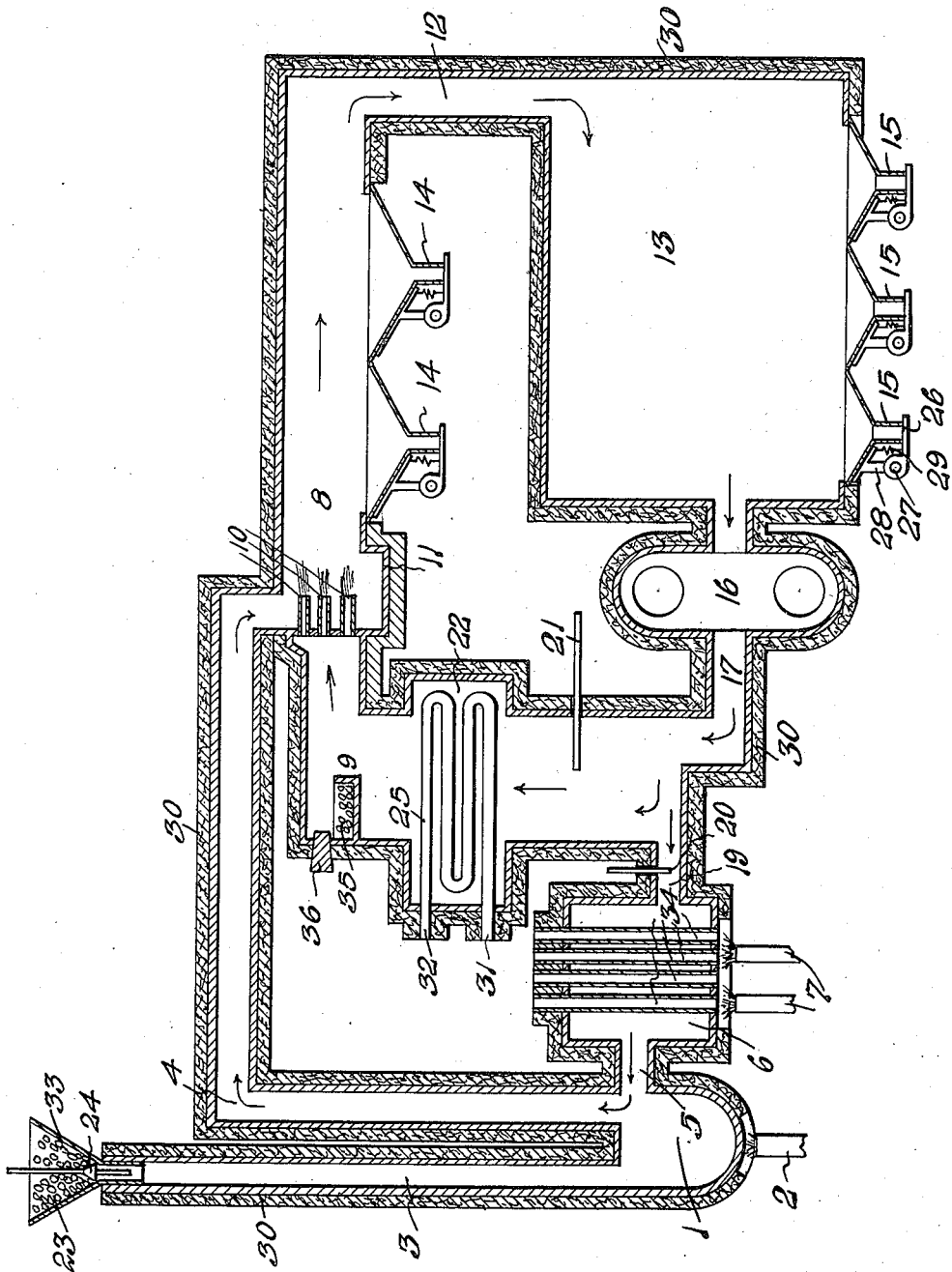
*Inventor:*  
Charles J. Reed Patented Dec. 2, 1924.

1,518,126

UNITED STATES PATENT OFFICE.

CHARLES J. REED, OF SAN MATEO, CALIFORNIA, ASSIGNOR OF ONE-HALF TO ALICE A. HALL, OF SAN FRANCISCO, CALIFORNIA.

PROCESS OF CONVERTING MASSIVE AND OTHER FORMS OF SULPHUR INTO FINELY-DIVIDED FLOWERS OF SULPHUR.

Application filed August 1, 1923. Serial No. 655,110.

*To all whom it may concern:*

Be it known that I, CHARLES J. REED, a citizen of the United States, residing at San Mateo, in the county of San Mateo and State of California, have invented new and useful Improvements in Processes of Converting Massive and Other Forms of Sulphur into Finely-Divided Flowers of Sulphur, of which the following is a specification.

My invention relates to the producing of flowers of sulphur. I accomplish this object by the process herein described, which consists in vaporizing any form of sulphur by heating it in a closed receptacle of any form to a temperature above the boiling point of sulphur, about 445 degrees C., diluting this vapor or gaseous sulphur without reducing its temperature by injecting into it an inert gas, or mixture of inert gases previously heated to a temperature not lower than the boiling point of sulphur, and subsequently projecting into the diluted gaseous mixture a previously cooled inert gas or gaseous mixture in sufficient quantity to reduce the temperature of the sulphur vapor below 115 degrees C., the melting point of sulphur. This solidifies the sulphur particles while the mass is diluted and thereby produces only minute particles of solid sulphur.

In the ordinary process of making flowers of sulphur the sulphur is vaporized and the undiluted vapor is projected into a condensing chamber, where it gradually cools and condenses, first to liquid drops, which afterwards solidify. In that process the undiluted vapor condenses to liquid particles which, on account of their proximity and great concentration into small volume, collect into comparatively large masses while still liquid. These large liquid masses on solidifying form large solid crystalline masses, most of them too large to be classed as flowers of sulphur.

In my improved process the dilution of the sulphur vapor before condensation by mixing it with a large quantity of previously heated inert gas separates the particles of sulphur vapor by increasing the distances between them and distributing them uniformly through a larger volume. Under these conditions the subsequent cooling and condensing produces only minute particles of liquid and solid sulphur. The minuteness obtainable by this process is limited only by the amount of dilution before reduction of temperature, that is, before there is any condensation of the vapor to the liquid or solid state.

My process may be carried out in any suitable form of apparatus, one of which is shown in the accompanying drawing. But I am not limited to the mechanism or arrangements shown, and it is largely diagrammatic in character and proportions, but, if constructed in accordance with the drawing, would be entirely operative.

In the drawing 1 represents a retort or vaporizing chamber heated by any suitable source of heat, 2. A vertical, tubular inlet, 3, is for the introduction of sulphur, 23, from the hopper, 33, and valve, 24. A short pipe, 5, connects the retort with a heater, 6, having a source of heat, 7. The heater, 6, is for preheating a portion of the circulating gases before their introduction into the vapor of sulphur. A tubular outlet, 4, for the transportation of heated gases and vapor of sulphur, leads from the retort to the condensing chamber, 8. Into this condensing chamber containing the hot, diluted sulphur vapor, cooled inert gas is projected from the tubular chamber, 9, through the tubular nozzles, 10. A trough, 11, below the nozzles, 10, is for the purpose of catching any liquid sulphur which may condense on the nozzles, 10, and fall down. A tube, 12, leads from the condensing chamber, 8, to the settling tank, 13, suitably arranged to collect the minute flowers of sulphur formed in 8. A series of conical outlets, 14, is for the exit of the flowers of sulphur formed in 8. A similar series of outlets, 15, is for that which collects in 13. A blower, 16, is for maintaining the circulation of the gases in the direction indicated by arrows. The tube, 17, conveys the gases from the blower, 16, into 18 and 19. The tubes, 18, and 19, convey portions of the circulating gas to the cooler, 22, and the heater, 6, respectively, A sliding door or diaphragm, 21, movable in a closely fitting slot, in the wall of the tube, 18, is adapted to regulate the flow of gases in the cooler, 22. A similar door, 20, in the tube, 19, regulates the flow of gases to the heater, 6. Each of the conical outlets, 14 and 15, is provided with a close-fitting door or a close-fitting receptacle. Such a door is shown in the drawing at the bottom of each outlet. Each door comprises a cover, 26, articulated by a hinge, 27, to a support, 28, and is held up by a retractile spring, 29. The gas cooler, 22, comprises a cooling coil of pipe, 25, having terminals, 31 and 32, and inclosed in the chamber, 22. One of the terminals, 31 or 32, is connected to a source of supply of cold water, not shown in the drawing. The heater, 6, comprises a number of vertical tubes, 34, through which the products of combustion pass from the burners, 7. The gases to be heated flow around the tubes, 34, into the retort, 1, as indicated by arrows. A shelf or other internal receptacle, 35, in the cold chamber, 9, is for holding a desiccator or other chemical reagent. A movable stopper, 36, closes an opening above this shelf.

In my improved process I prefer to introduce lime or other active basic chemical reagent into the gaseous circuit to absorb oxides of sulphur and other gases which may be present and detrimental to the product. I prefer nitrogen as a circulating medium, though a mixture of nitrogen and sulphur dioxide operates satisfactorily.

The entire apparatus is protected from loss of heat by the insulating covering, 30.

The covers of the outlets, 14 and 15, are to prevent the influx of air, but may be opened for the outflow of sulphur.

In the operation of my process I introduce sulphur, 23, in any form, solid or liquid, into the retort, 1, by raising the valve, 24. The blower, 16, is set in operation, causing a continuous circulation of the air within the closed system, as indicated by arrows. The burners, 2 and 7, are set in operation and cold water, or other cooling agent, is caused to flow from a source not shown in the drawing through the coil, 25, of the cooler. When the temperature in the retort and in the heater, 6, exceeds 445 to 448 degrees C., vapor of sulphur formed in the retort and mixed with the heated air, is oxidized to sulphur dioxide, which with the residual nitrogen and vapor of sulphur passes through the tube, 4, into the condensing chamber, 8. The tube, 4, must be well insulated and the temperature of the mixed gases from the retort and heater must be maintained above the boiling point of sulphur, to prevent condensation of sulphur in the tube, 4. I prefer a temperature of at least 460 C. In a short time all oxygen originally contained in the system is converted into sulphur dioxide and the circulating gas is then a mixture of nitrogen and sulphur dioxide. The sulphur dioxide may be, but need not necessarily be, absorbed by lime or other basic active chemical reagent. The mixture of nitrogen and sulphur dioxide, or the nitrogen alone, or the nitrogen mixed with argon and whatever other inert gases may be present, I designate for brevity in this specification and in my claims as the "circulating medium." By "superheated" I mean at or above the boiling point of sulphur.

The portion of the circulating medium which is diverted through the cooler, 22, should be cooled to as low a temperature as may be convenient and economical. It flows after cooling through the tubular chamber, 9, and the nozzles, 10, into the condensing chamber, 8, mixing with the superheated and diluted vapor of sulphur and condensing it to minute solid crystals. The introduction of the superheated circulating medium into the vapor of sulphur at or in the retort, or in the tube, 4, leading from the retort, is very important and is one of the essential steps in my process. Its purpose is to dilute the sulphur vapor without condensing it, thus causing the atoms or molecules of gaseous sulphur to separate to greater distances apart and to become separated by intervening particles of other inert, noncondensible gases. After this separation of the molecules of sulphur vapor by intervening inert gaseous particles has been accomplished while the sulphur remains in the gaseous state, it is then possible by proper cooling to condense the individual separated sulphur molecules to the solid state and produce the finest possible flowers of sulphur. If, however, the undiluted vapor of sulphur be cooled and condensed, as is done in methods heretofore employed, the particles of sulphur in condensing to the liquid state will, on account of their proximity and the absence of any other intervening inert gaseous particles, collect together into comparatively large liquid drops, which on solidifying will form comparatively large crystalline masses.

I am not limited to any particular proportions in the gaseous mixture, but prefer to dilute the hot sulphur vapor by about ten times its volume of the superheated circulating medium. This mixture passes through the heated tube, 4, into the condensing chamber, 8. Into this condensing chamber and into the diluted vapor of sulphur is also projected through the nozzles, 10, a cold portion of the circulating medium coming from the cooler, 22, through the tubular chamber, 9. I prefer to inject of the cold medium about ten times the volume of the superheated mixture, and prefer to have the cold medium at a temperature not higher than about forty degrees C. With these proportions and operating at the temperatures above mentioned I find that practically all of the sulphur vapor is condensed to the solid state in exceedingly small particles.

A portion of the condensed flowers of sulphur formed in the chamber, 8, fall to the bottom of the chamber and are collected in the outlets, 14, but a large portion is carried by the circulating medium through the tube, 12, into the settling tank, 13, where it collects and is removed through the outlets, 15.

I claim:

1. The process of producing flowers of sulphur, which consists in vaporizing the sulphur at a temperature not lower than the boiling point of sulphur, mixing the vapor of sulphur with an inert gaseous circulating medium also at a temperature not less than the boiling point of sulphur, and subsequently mixing these products with an inert gaseous circulating medium at a lower temperature.

2. The process of producing flowers of sulphur, which consists in vaporizing the sulphur at a temperature not lower than the boiling temperature of sulphur, mixing the vapor of sulphur with an inert gas at a temperature not less than the boiling temperature of sulphur, and subsequently mixing the product with an inert gas at a temperature lower than the fusing temperature of sulphur.

3. An apparatus for producing flowers of sulphur, comprising a vaporizing chamber for vaporizing sulphur, a heating chamber adapted to heat a portion of a gaseous circulating medium, a cooling chamber adapted to cool a portion of a gaseous circulating medium, a condensing chamber adapted to receive the heated and cooled portions of a gaseous circulating medium, and a blower adapted to circulate a gaseous medium, all connected into a closed system, substantially as herein set forth.

CHARLES J. REED.